United States Patent
Waller et al.

(10) Patent No.: US 10,784,496 B2
(45) Date of Patent: Sep. 22, 2020

(54) ELECTRICAL BYPASS DEVICE FOR BYPASSING AN ELECTRICAL ENERGY SOURCE OR AN ENERGY CONSUMER

(71) Applicant: FRAUNHOFER-GESELLSCHAFT ZUR FOERDERUNG DER ANGEWANDTEN FORSCHUNG E.V., Munich (DE)

(72) Inventors: Reinhold Waller, Neunkirchen/Br. (DE); Vincent Lorentz, Erlangen (DE); Martin Maerz, Nuremberg (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 190 days.

(21) Appl. No.: 16/301,464

(22) PCT Filed: May 15, 2017

(86) PCT No.: PCT/EP2017/061581
§ 371 (c)(1),
(2) Date: Nov. 14, 2018

(87) PCT Pub. No.: WO2017/198599
PCT Pub. Date: Nov. 23, 2017

(65) Prior Publication Data
US 2019/0131612 A1  May 2, 2019

(30) Foreign Application Priority Data
May 17, 2016 (DE) .................. 10 2016 208 419

(51) Int. Cl.
*H01M 2/34* (2006.01)
*B23K 1/00* (2006.01)
*B23K 101/38* (2006.01)

(52) U.S. Cl.
CPC .......... *H01M 2/348* (2013.01); *B23K 1/0006* (2013.01); *B23K 2101/38* (2018.08); *H01M 2200/101* (2013.01)

(58) Field of Classification Search
CPC .............................................. H01M 2200/101
See application file for complete search history.

(56) References Cited

U.S. PATENT DOCUMENTS

| 4,879,188 A | 11/1989 | Meinhold et al. ................. 429/7 |
| 2013/0011511 A1 | 5/2013 | Han et al. ...................... 429/208 |

(Continued)

FOREIGN PATENT DOCUMENTS

| DE | 10 2007 017 018 A1 | 3/2008 | .............. H01M 2/20 |
| DE | 10 2013 206 191 A1 | 10/2014 | .............. H01M 2/31 |
| WO | WO 01/83182 A1 | 11/2001 | .............. C06B 45/12 |

OTHER PUBLICATIONS

International Search Report dated Jul. 24, 2017 in related application No. PCT/EP2017/061581.

(Continued)

*Primary Examiner* — Christopher P Domone
(74) *Attorney, Agent, or Firm* — Renner Kenner Greive Bobak Taylor & Weber

(57) ABSTRACT

An electrical bypass device has two electrical conductors electrically insulated from one another and arranged such that two surface regions of the conductors are spaced apart from one another by a gap. Above the surface regions is a bypass element having at least one electrically conductive layer in the form of or connected to a mechanical energy store. The mechanical energy store is transferable by thermal triggering from a first mechanical state to a stable second mechanical state in which the electrically conductive layer of the bypass element makes electrical contact with the surface regions and shorts the two electrical conductors. Above the surface regions is a reactive element where an (Continued)

exothermic reaction can be triggered, resulting in the mechanical energy store transferring to the stable second mechanical state.

14 Claims, 2 Drawing Sheets

(56) References Cited

U.S. PATENT DOCUMENTS

2013/0252039 A1\* 9/2013 Vom Dorp ........ H01M 10/4207
    429/61
2013/0302654 A1  11/2013 Schaefer .......................... 429/50
2015/0340182 A1\* 11/2015 Yoneda ............... H01M 10/425
    337/17

OTHER PUBLICATIONS

Written Opinion dated Jul. 24, 2017 in related application No. PCT/EP2017/061581.

\* cited by examiner

ELECTRICAL BYPASS DEVICE FOR BYPASSING AN ELECTRICAL ENERGY SOURCE OR AN ENERGY CONSUMER

CROSS-REFERENCE TO RELATED APPLICATION

This is a § 371 application of International patent application number PCT/EP2017/061581 filed May 15, 2017, which claims the benefit of German patent application number 10 2016 208 419.4, filed May 17, 2016, and which are incorporated herein by reference.

TECHNICAL FIELD

The present invention concerns an electrical bypass device consisting of at least two electrical conductors electrically insulated from each other, which can be electrically connected to each other by triggering an exothermic reaction in a reactive layer arranged above the conductors.

Such an electrical bypass device serves in particular to bypass an energy source or an energy consumer. Such energy sources or energy consumers can be found in a large number of devices, e.g. in electric vehicles or stationary energy storage devices. The electrical energy can be stored in chemical form, as in the case of battery cells, or also in physical form, e.g. in capacitor cells. In order to generate sufficient voltages and high currents from 100 to 1000 A, as required, for example, for motor vehicles with electric drives, a plurality of these cells, e.g. between 4 and more than 100 cells, are connected in series to form a stack of cells. The reliability of the entire stack and the reorganisation of the stack in the event of a cell failure represents a challenge for cells connected in series. If no further measures are undertaken, if one cell in a stack fails, the entire system will fail, even though the stack itself still comprises a sufficient number of intact cells. When such a system is used in an electric vehicle, and also in the case of most hybrid vehicles, a cell fault can therefore lead to a system failure. Furthermore, a degraded battery cell can also have an increased internal resistance, which then leads to an inadmissible heating of the cell. In principle, it is therefore desirable to be able to bypass defective cells electrically during operation of the energy storage device in order to avoid such problems.

PRIOR ART

To solve the above problems, so-called inverse fuses (anti-fuses) are of known art, which electrically bypass the corresponding cell or consumer in the event of a failure.

These inverse fuses are mainly used in low power systems, such as integrated circuits and lighting systems. Fuses that have a thin barrier made of a non-conductive amorphous silicon between two metal contacts are of known art, for example. If a sufficiently high voltage is applied to the amorphous silicon via the two terminals, this is converted into a conductive, polycrystalline silicon-metal alloy with low resistance. In the case of lighting systems, such an inverse fuse prevents the entire series circuit from failing if an individual lamp fails. Here the lamps are equipped with this fuse. If the lamp fails, the entire mains voltage is applied across the individual failed lamp. This renders the fuse operative and the failed lamp is electrically bypassed so that the series circuit can continue to perform its function.

Furthermore, it is of known art, e.g. in the field of photovoltaics, for energy sources and energy consumers to be bypassed by bypass diodes. The bypass diodes serve to handle short-term interruptions in energy generation by a cell, e.g. in the event of a shading of a solar generator cell. Bypass diodes, however, only establish a unidirectional connection, so that an energy storage device with bypass diodes would only function reliably in the case of energy output. However, it would not be possible to recharge the remaining intact cells, since the diode would block in the opposite direction. Therefore, bypass diodes, as of known art from the field of photovoltaics, do not represent a sensible bypass measure for the applications cited above.

From DE 37 21 754 A1 a bypass device for the safeguarding of battery cells is of known art, which enables an irreversible bypassing of damaged storage cells failing in a high impedance mode. The bypass device consists of two semiconductor components arranged in series in layers, each with a different current/voltage characteristic. In the event of a high impedance failure of a damaged storage cell, the high charging current flows through the two semiconductor components, which, as a result of the steep rise in temperature, short together and thereby irreversibly short-circuit the storage cell with a low impedance. However, such a passive bypass device is only triggered if the accumulator cell is already severely degraded. An early triggering, for example to prevent high power losses, is not possible.

The inverse fuses described thus far are not suitable for use in the applications cited above, e.g. in batteries for providing the power for an electric drive. This is mainly due to the high resistance of these fuses in the triggered state, which leads to power dissipation in the range of up to 50 W, and thus to an inadmissible heating of the fuses, to the low current carrying capacity of these fuses and also to their high costs.

DE 10 2012 005 979 A1 describes an electrical bypass element for the bypassing of defective storage cells in energy storage devices, which in principle is also suitable for batteries of high electrical power. In this bypass element, a layer sequence is formed between two electrical conductors with at least one electrical insulation layer and one or more reactive layer stacks, in which an exothermic reaction can be triggered. The reactive layer stacks and the insulation layer are coordinated in such a way that the insulation layer disintegrates due to the thermal energy released during the exothermic reaction and an electrical connection is established between the electrical conductors. Residues from the insulation material can, however, cause problems in the case of this bypass element.

The object of the present invention is to specify an electrical bypass device, in particular for bypassing electrical energy sources or consumers, which, when triggered, can carry high currents with, at the same time, a low series resistance, enables a permanent irreversible bypass and can be manufactured cost-effectively.

PRESENTATION OF THE INVENTION

The object is achieved with the electrical bypass device in accordance with claim 1. Advantageous embodiments of the bypass device are the subject matter of the dependent patent claims, or can be found in the following description together with the examples of embodiment.

The proposed electrical bypass device has at least two electrical conductors that are electrically insulated from each other, and in use are connected, for example, to the two poles of an energy source or an energy consumer to be bypassed. The two electrical conductors are arranged such that at least a first surface region of the first conductor oriented in a spatial direction is spaced apart by a gap from at least a second surface region of the second conductor oriented in the same spatial direction. Here the orientation of a surface region in a spatial direction is to be understood to mean that from this spatial direction the surface region can be recognised as a surface region. The main purpose of this is to make it clear that the two surface regions are neither directed against each other, nor at right angles to each other. A bypass element with at least one electrically conductive layer is arranged above the two surface regions and is designed as a mechanical energy storage device, or is connected to a mechanical energy storage device, which can be transferred from a first mechanical state to a stable second mechanical state by thermal triggering. A mechanical energy storage device can be, for example, a pre-loaded mechanical element, or an element that has at least two different stable mechanical states, for example an actuator made of a shape memory alloy or a bimetallic element. The mechanical energy storage device is designed and arranged in such a way that the electrically conductive layer of the bypass element in the stable second mechanical state of the mechanical energy storage device makes electrical contact with the surface regions of the two electrical conductors and thus short-circuits the two electrical conductors. Furthermore, a reactive element is arranged above the surface regions, for example as a further layer of the bypass element, or as a separate element, in which an exothermic reaction can be triggered, as a result of which the mechanical energy storage device changes into the second mechanical state. In the non-triggered state of the bypass device, the mechanical energy storage device is in the first mechanical state, in which the electrical conductors are not short-circuited by the electrically conductive layer of the bypass element. The reactive element can be formed as a reactive layer that is part of the bypass element. In the case of a design as a separate element, the reactive element preferably abuts against the bypass element, but is not materially connected to the bypass element.

In the present patent application, the term reactive layer or reactive element is to be understood to refer to a layer or film made of a reactive material, which can also be designed as a coherent layer sequence of different layer materials, i.e. as a layer stack. To trigger the bypass device, the exothermic reaction in the reactive layer or reactive element just has to be triggered. The thermal energy generated in this way transfers the mechanical energy storage device into the second mechanical state, in which the electrically conductive layer of the bypass element makes electrical contact with the two electrical conductors and thus short-circuits them. Since the second mechanical state is a stable state, the mechanical energy storage device remains in this state even without any further heat exposure.

Depending on the type of reactive material, the exothermic reaction in the reactive element can be triggered by a current flow, heating, a sparking action, laser radiation, or with the aid of an initial igniter. An example of a reactive element is a reactive nano-film, e.g. a reactive Ni/Al-film, as is of known art from WO 01/83182 A1. Such nano-films consist of a large number of nano-layers, e.g. with layer thicknesses in the range from 1 nm to 500 nm, wherein layers of two different materials usually alternate, which react exothermically with each other by means of a suitable energy input. Other reactive layers can also be used in the proposed bypass device, e.g. layers of nano-thermite or other exothermically reacting materials.

With the proposed bypass device, an energy source, e.g. a battery cell, or an electrical consumer, as the component to be bypassed, can be bypassed electrically with low impedance by triggering the exothermic reaction. In the triggered state, a resistance of less than $100\mu\Omega$ can be achieved with an active region (the region under the reactive layer) of approx. 1 cm². In the non-triggered state, the bypass device can have a resistance greater than 40 M$\Omega$, depending on the design. The proposed bypass device thus also enables the flow of high currents, as can occur in the applications cited above, and can be implemented cost-effectively due to its simple design.

In a preferred design of the proposed bypass device, the irreversible electrical contact between the two electrical conductors is aided by establishing a soldered connection. In a first advantageous design, the first and second surface regions are each covered with a layer of an electrically conductive material that has a lower melting point than the material of the electrical conductors. This layer preferably takes the form of a metallic solder material. In principle, however, other materials are also possible, e.g. electrically conductive polymer materials. Here the reactive element is dimensioned and arranged on the bypass element in such a way that the two layers of the electrically conductive material fuse as a result of the thermal energy emitted during the exothermic reaction of the reactive layer, and thereby establish a soldered connection with the electrically conductive layer of the bypass element, which in the triggered state of the bypass device rests on the surface regions or the solder layers applied thereto.

In a second advantageous configuration, the bypass element is covered on a side facing the surface regions with a layer of an electrically conductive material that has a lower melting point than the electrical conductors. This is also preferably a metallic solder material, but can also be another material, such as an electrically conductive polymer material. This layer can take the form of an additional layer, which is formed in addition to an electrically conductive layer and, where appropriate, in addition to the reactive layer on the bypass element. This layer can also take the form of the only electrically conductive layer of the bypass element. The reactive layer or reactive element is again dimensioned and arranged in such a way that the electrically conductive material fuses as a result of the thermal energy released during the exothermic reaction of the reactive layer, thereby forming a soldered connection with the electrical conductors on which the bypass element rests in the triggered state of the bypass device. A combination of the first and second advantageous designs is also possible, whereby both the two surface regions of the electrical conductors and also the side of the bypass element opposite these surface regions then have an appropriate layer of an electrically conductive material suitable for establishing a soldered connection.

Both the electrical insulation between the two electrical conductors and also the insulation of at least one of the surface regions of the bypass element are selected to suit the respective application. Here the insulation between the two electrical conductors can be ensured by means of an air gap and also by using an insulation material between the two electrical conductors.

The two electrical conductors are preferably structured in such a way that as long a boundary line as possible is created between the surface regions of the said conductors that are to be bypassed. In a preferred design, the first surface region (of the first conductor) hereby encloses the second surface region (of the second conductor). The bypass element is preferably designed so as to cover the second surface region, the gap between the two surface regions, and at least part of the first surface region.

In an advantageous design, the bypass element itself is designed as a mechanical energy storage device. For this purpose, the bypass element preferably has a layered composite of at least two materials of different thermal expansions, which can assume two stable bending states as first and second mechanical states. This layered composite preferably represents a bimetallic layer. In the present patent application, the term layer also includes self-supporting, i.e. plate-shaped elements, so that the above layered composite can also take the form of a bimetallic plate. At the same time the bimetallic layer represents an electrically conductive layer of the bypass element. In a combination of this design with an arrangement of the electrical conductors, in which the first surface region surrounds the second surface region, the bypass element is preferably designed in the shape of a dome over the surface regions in the non-triggered state (the first mechanical state). When the bypass element is triggered, the bypass element curves downwards and establishes the electrically conductive connection between the two electrical conductors.

In another advantageous design of the proposed bypass device, the mechanical energy storage device is designed to be separate from the bypass element and connected to the latter. In the non-triggered state of the bypass device, in which it is located in the first mechanical state, the mechanical energy storage device is prevented from transferring from the first to the second mechanical state by a restraining force of the reactive element. Here the mechanical energy storage preferably takes the form of an elastic element, for example a spring element, which is maintained in a pre-loaded state by the reactive element as the first mechanical state. When the exothermic reaction is triggered, the reactive element is destroyed, or at least loses its restraining force, so that the mechanical energy storage device can thus translate into its second mechanical state and thereby presses the bypass element against the two surface regions. To generate the restraining force, the reactive element must rest suitably on one or a plurality of spacers, which are preferably arranged around the region with which electrical contact is to be made. Here this can take the form of a suitable frame, for example. The other components of the bypass element are embodied in such a way that they do not rest on these spacers or this frame. This design requires a reactive element that can exert a suitable restraining force. This applies in particular to the reactive nano-films referred to above, which offer sufficient restraining forces, and lose them when the exothermic reaction is triggered.

The exothermic reaction can be triggered, for example, thermally by way of a current flow through the reactive element. Thus, contact can be made with the reactive element, for example, by one or a plurality of contact pins, so as to apply an electrical voltage. A bottleneck in the reactive element can also be created by way of suitable structuring, at which appropriate heat generation is achieved with a current flow by virtue of the increased resistance. The reactive element can also be activated, that is to say, triggered, optically, e.g. by means of a light pulse or laser pulse. In a further design, an initial igniter can be used, for example in the form of a reactive wire, which is arranged in contact with, or at least in the vicinity of, the reactive element. Such a reactive wire also consists of a reactive material, e.g. a layer sequence of Al and Pd, and can, for example, be thermally triggered by a current flow. Such reactive wires are also commercially available, e.g. under the name Pyrofuze®. The reactive layer can also be triggered by means of electrical sparks. Needless to say, this is not an exhaustive list.

With the proposed bypass device, a low resistance electrical connection that can be irreversibly activated is provided. This allows a faulty component in a current path to be bypassed and thus the function of the overall system to be ensured. Examples are the bypassing of defective components and modules, in particular energy storage devices, such as battery cells, accumulators, double layer capacitors, or lithium-ion capacitors, fuel cells, or electrical consumers. Furthermore, with the proposed bypass device, energy accumulators such as lithium-ion battery cells can be deactivated by triggering a fuse or a shutdown separator with short-circuit currents in the 10 kA range.

BRIEF DESCRIPTION OF THE FIGURES

The proposed bypass device is explained in more detail below using two examples. Here.

WAYS OF REALISING THE INVENTION

Figure 1:
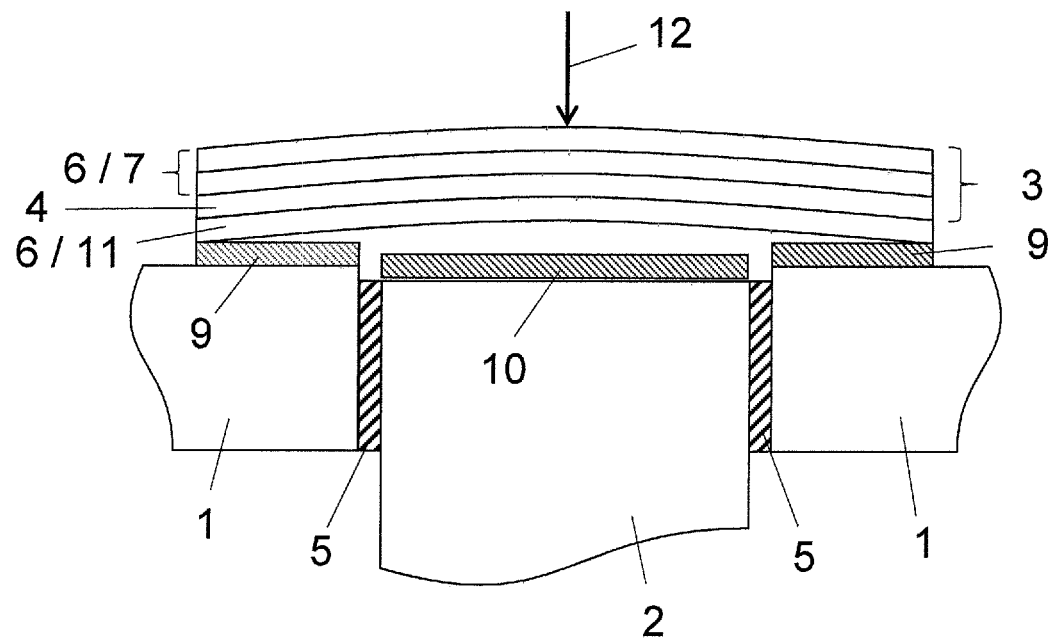
FIG. 1 shows a cross-sectional view through a first example of a bypass device in the non-triggered state.

FIG. 1 shows a first example of a design of the proposed bypass device. The bypass device has two electrodes 1, 2 that are insulated from each other. The electrodes are structured in such a way that as long a boundary line as possible is created between their surface regions, which are close to each other on the upper side. In the present case, this is achieved by a rotationally symmetrical design in which the surface region of the first electrode 1 completely surrounds the surface region of the second electrode 2 in the form of a ring. Between the two electrodes 1, 2 there is located electrical insulation material 5, which also acts as a spacer. A solder layer 9, 10 is located on each of the adjacent surface regions of the two electrodes 1, 2. A bypass element 3, which has at least one electrically conductive layer 6, with which the two electrodes 1, 2 can be electrically connected to each other, is arranged above the surface regions. In the present example, this bypass element 3 consists of a bimetallic element 7 consisting of two bimetallic layers, a reactive layer 4 and a solder layer 11. Both the solder layer 11 and the bimetallic element 7 can be regarded as electrically conductive layers 6. The bimetallic element 7 is shaped in such a way that it can assume two stable mechanical states, and thus represents a bistable mechanical energy storage device. FIG. 1 shows the first stable mechanical state, in which the bypass element 3 is curved upwards with the bimetallic element 7, and thus does not establish an electrical connection between the two electrodes 1, 2.

To activate the bypass device, the exothermic reaction is triggered in the reactive layer 4. The resultant heating causes the bimetallic element 7 to jump to its more stable second geometric or mechanical state, in which it is curved downwards and thus electrically connects the two electrodes 1, 2 via the solder layers 9, 10, 11, which fuse with each other as a result of the thermal energy in the exothermic reaction.

The bypass element 3 is arranged in such a way that a minimum distance is maintained between the solder layer 11 on the bypass element and the solder layer 10 of the second electrode 2 in order to maintain the insulation between the two electrodes 1, 2 in the non-triggered state of the bypass device. The bypass element 3 rests on the outer electrode 1, as shown in the figure. The bypass element 3 can, however, also be arranged such that it is insulated from the first electrode 1, as a result of which a triggering event that is galvanically isolated from the switched current path is enabled. In this example, the bypass element 3 is preferably designed and arranged in a dome-shaped, or almost dome-shaped, form over the two surface regions, so that the reaction volume is closed off from the external environment.

In principle, this bypass device is suitable for both low voltages (e.g. battery cells with a few volts) and higher voltages (e.g. battery modules, battery packs and fuel cells with several 100 V). Due to the limited deflection of the bimetallic element 7 with the associated limitation of the maximum distance from the electrodes, however, the dielectric strength of such a design is limited.

In principle, either the solder layer 11 on the bypass element 3 or the solder layers 10, 11 on the surface regions of the electrodes 1 can also be dispensed with, as the electrical connection can also be made only through the solder layer 11 on the bypass element 3 or through the solder layers 9, 10 on electrodes 1, 2. A complete abandonment of the solder layers is also possible in principle. However, this would reduce the electrical conductivity and the mechanical stability of the connection between the two electrodes, compared to a design with solder layers.

The exothermically reacting material of the reactive layer 4, e.g. a reactive Ni/Al film, can be triggered by current flow, sparks, laser or an initial igniter, e.g. via a reactive Al/Pd wire. FIG. 1 schematically indicates a triggering contact 12. When the exothermic reaction is triggered, the solder layers 9, 10 and 11 are fused, resulting in a permanent electrical and mechanical connection. This process can also be aided by an incipient current flow.

Figure 2:
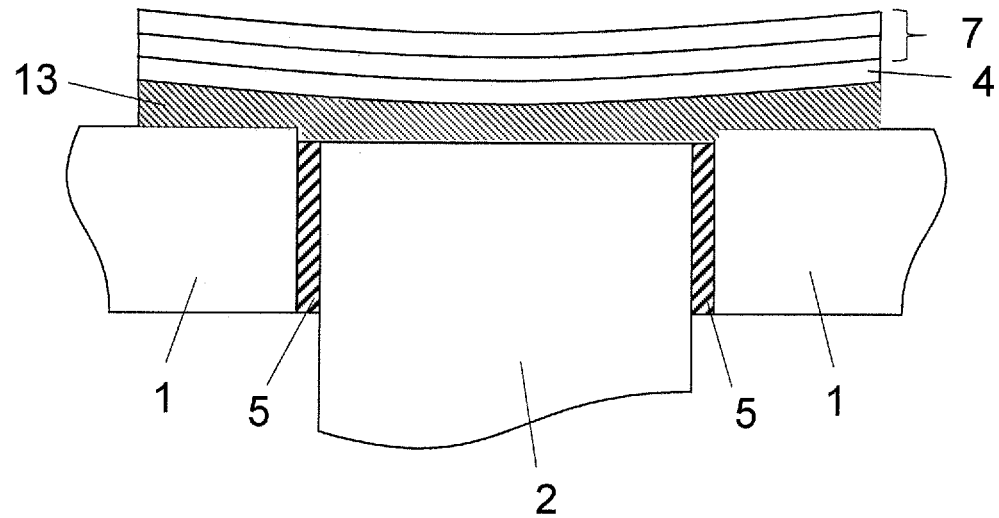
FIG. 2 shows the example of FIG. 1 in the triggered state.

FIG. 2 illustrates the situation in the triggered state in which solder layers 9, 10 and 11 are fused to form a single solder layer 13, so as to establish the permanent electrical connection between the two electrodes 1 and 2.

Figure 3:
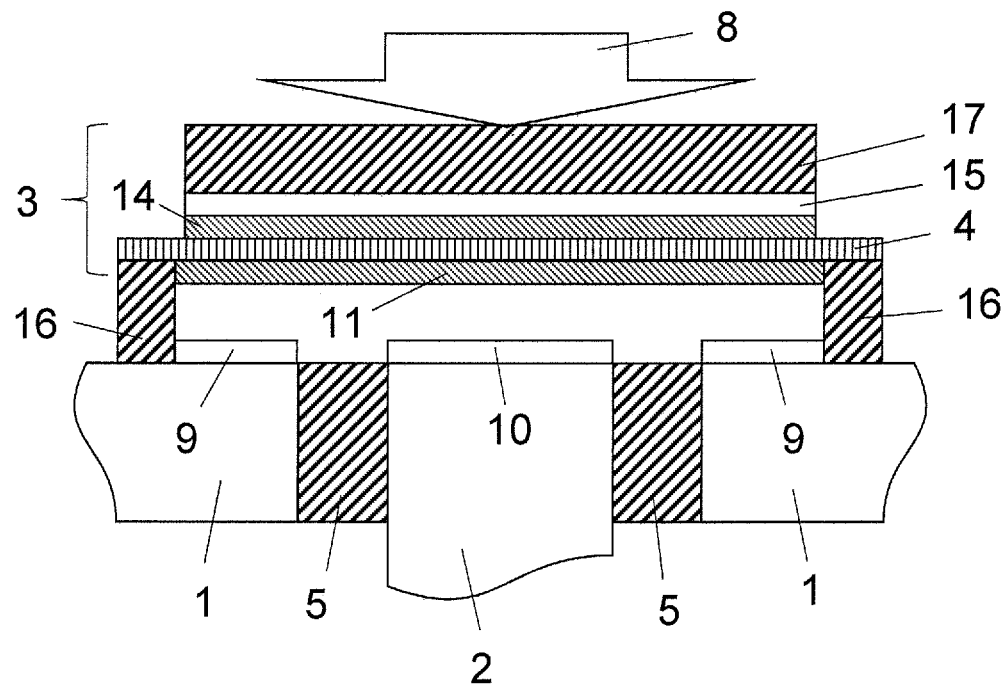
FIG. 3 shows a cross-sectional view through a second example of the proposed bypass device in the non-triggered state.

FIG. 3 shows another example of a design of the proposed bypass device in which the surface region of the outer electrode 1 completely surrounds the surface region of the inner electrode 2. In the present example, this can be done both axisymmetrically and in rectangular form. The two electrodes 1, 2 are again insulated from each other by a suitable insulator 5. A solder layer 9, 10 is again located on each of the surface regions of the electrodes 1, 2. The bypass element 3 is arranged above the electrodes; in this example it rests on one or more spacers 16, as shown in the figure. Here the one or more spacers 16 can consist of both an insulator and also an electrically conductive material. The use of an electrically insulating spacer again has the advantage that it enables a triggering event that is galvanically isolated from the switched current path. The spacer 16 is preferably designed as a surrounding frame, so that a closed reaction volume is also formed here above the surface regions of the electrodes 1, 2. Here the bypass element 3 rests only with the reactive layer 4 on this spacer 16. Solder layers 11, 14 are formed both above and below the reactive layer 4.

In addition an electrically conductive layer 15, e.g. a metal plate, is arranged above the upper solder layer 14. Here the upper solder layer 14 can also be omitted. The same applies to the solder layer 11 or the two solder layers 9, 10, as already explained in connection with the previous example of embodiment.

Figure 4:
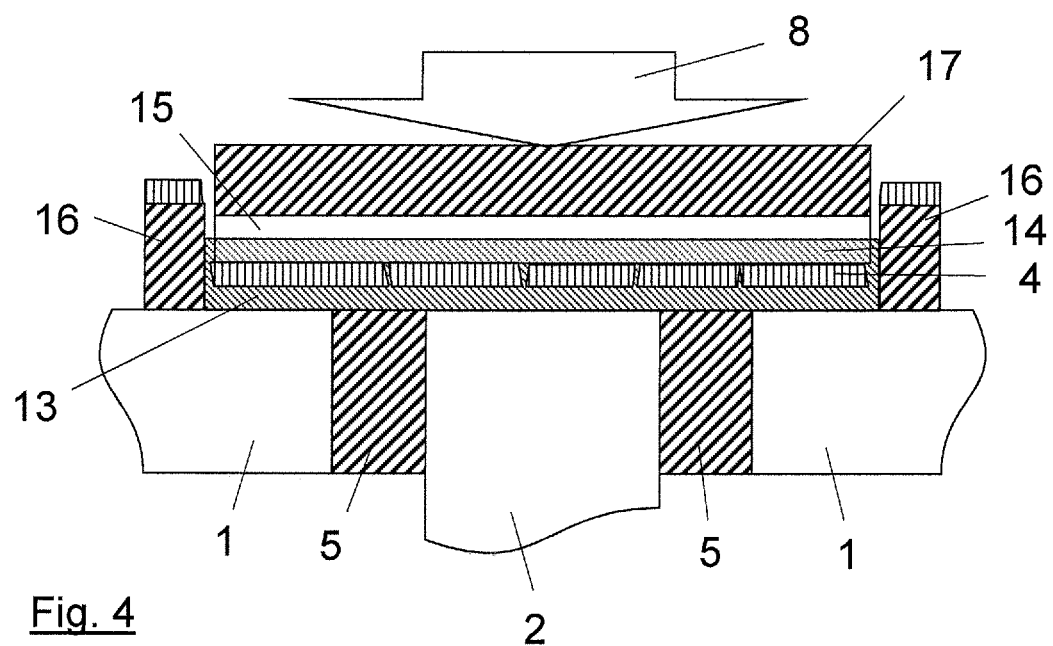
FIG. 4 shows the example of FIG. 3 in the triggered state.

In the present example, a pre-loaded spring element 8 is used as a mechanical energy storage device, as is indicated in FIGS. 3 and 4 by the direction of force exerted by this spring element 8. The spring element 8 provides the necessary contact pressure when the bypass device is triggered and is held in its pre-loaded first mechanical state by the restraining force of the reactive layer 4. Between the spring element 8 and the reactive layer 4 there is located the electrically conductive layer 15, and optionally the further solder layer 14, to reduce the resistance of the bypass element in the triggered state. The edge of the reactive layer 4 rests on the insulating or conductive spacer frame 16 and thus holds the bypass element 3 in its position.

The bypass device is triggered by the exothermic reaction of the reactive layer 4. By this means on the one hand the solder coating 11, 14 of the reactive layer is fused, and on the other hand the mechanical restraint of the spring element 8 is destroyed. The bypass element is subsequently pressed onto the lower electrodes 1, 2, that is to say, onto the solder layers 9, 10 located on the latter, and the solder layers fuse together. This leads to a permanent electrical and mechanical connection between the electrodes 1, 2. This process can be aided by an incipient current flow as soon as a first connection has been established. The exothermic material of the reactive layer 4 can be triggered in the same way as has already been explained in connection with the previous example. FIG. 4 shows the situation in the triggered state in which the bypass element 3 is pressed against the electrodes 1, 2. The destruction of the reactive layer 4 is also schematically indicated in this figure. In the present example, an additional thermal insulation layer 17 is provided between the electrically conductive layer 15 and the spring element 8. This layer serves to prevent dissipation of the heat generated by the exothermic reaction.

In principle, the contact pressure element, in the present example a spring element, can consist either of an electrically conductive material, e.g. a metal such as copper or aluminium, or of an electrically insulating material, e.g. a plastic. Here this contact pressure element can be fixedly connected to the bypass element, or it can only rest loosely on this element. The contact pressure element represents the mechanical energy storage device and is clamped between the bypass element and a carrier structure, e.g. a housing of the bypass device. This cannot be seen in the figures.

In principle, the bypass device is suitable for both low voltages (e.g. battery cells with a few volts) and also higher voltages (e.g. battery modules, battery packs and fuel cells with several 100 V). In the present example of FIGS. 3 and 4, a relatively large insulation distance can be set between the electrodes 1, 2 and also between the electrodes and the bypass element 3. Thus this bypass device can be used for higher electrical voltages than the bypass device of FIGS. 1 and 2.

The proposed bypass device, as has been explained in the preceding examples, will preferably be integrated in or on a battery cell, i.e. in the battery cell housing, or on the battery cell housing.

LIST OF REFERENCE SIGNS

1 First electrode
2 Second electrode
3 Bypass element
4 Reactive layer
5 Insulator
6 Electrically conductive layer
7 Bimetallic element
8 Spring element
9 Solder layer
10 Solder layer 11 Solder layer
12 Triggering contact
13 Solder layer
14 Solder layer
15 Electrically conductive layer
16 Spacer or frame
17 Thermal insulator

The invention claimed is:

1. An electrical bypass device, which
has at least one first and one second electrical conductor which are electrically insulated from each other, and are arranged such that at least one first surface region of the first conductor, oriented in a spatial direction, is spaced apart by a gap from at least one second surface region of the second conductor, oriented in the same spatial direction,
a bypass element with at least one electrically conductive layer is arranged above the two surface regions and is designed as a mechanical energy storage device, or is connected to a mechanical energy storage device, which can be transferred by thermal triggering from a first mechanical state to a stable second mechanical state, in which the electrically conductive layer of the bypass element makes electrical contact with the surface regions and thus short-circuits the two electrical conductors,
wherein a reactive element is arranged above the two surface regions, in which an exothermic reaction can be triggered, as a result of which the mechanical energy storage device changes into the stable second mechanical state.

2. The bypass device in accordance with claim 1, characterised in
that, the bypass element has a reactive layer as the reactive element.

3. The bypass device in accordance with claim 1, characterised in
that, the first and second surface regions are each covered with a layer of an electrically conductive material, which has a lower melting point than the electrical conductors, and
the reactive element is dimensioned and arranged such that the two layers of the electrically conductive material fuse as a result of the thermal energy outputted during the exothermic reaction of the reactive element, and thereby establish a soldered connection with the electrically conductive layer of the bypass element.

4. The bypass device in accordance with claim 1, characterised in
that, the bypass element is covered on a side facing the surface regions with a layer of an electrically conductive material, which has a lower melting point than the electrical conductors, or the electrically conductive layer of the bypass element is formed of such a material, and
the reactive element is dimensioned and arranged such that this electrically conductive material fuses as a result of the thermal energy released during the exothermic reaction of the reactive element, and thereby a soldered connection is established with the electrical conductors, or with the electrically conductive material applied to the surface regions of the electrical conductors.

5. The bypass device in accordance with claim 1, characterised in
that, the bypass element comprises a layered composite of at least two materials of different thermal expansions as a mechanical energy storage device, which layered composite can assume two stable bending states as the first and the second mechanical state.

6. The bypass device in accordance with claim 5, characterised in
that, the layered composite is formed by a bimetallic layer.

7. The bypass device in accordance with claim 5, characterised in
that, the first surface region encloses the second surface region, and the bypass element is designed in the shape of a dome over the enclosed region.

8. The bypass device in accordance with claim 7, characterised in
that, the second surface region is arranged offset in height below the first surface region.

9. The bypass device in accordance with claim 1, characterised in
that, the mechanical energy storage device is prevented by a restraining force of the reactive element from moving from the first to the second mechanical state before the exothermic reaction is triggered.

10. The bypass device in accordance with claim 9, characterized in that, the mechanical energy storage device is an elastic element, optionally a spring element, which is held by the reactive element in a pre-loaded state as the first mechanical state.

11. The bypass device in accordance with claim 10, characterised in
that, a support structure is arranged above the bypass element and the elastic element, and is fixedly connected to the first and/or second electrical conductor, wherein the elastic element is clamped between the support structure and the bypass element.

12. The bypass device in accordance with claim 9, characterised in
that, the first surface region encloses the second surface region, and the reactive layer rests on one or a plurality of spacers arranged around the enclosed region.

13. The bypass device in accordance with claim 9, characterised in
that, the bypass element has a thermally insulating layer at the junction with the mechanical energy storage device.

14. The bypass device in accordance with claim 1, which is integrated into an electric battery cell, or arranged on an electric battery cell.

* * * * *